United States Patent [19]
Hancock et al.

[11] Patent Number: 5,574,914
[45] Date of Patent: Nov. 12, 1996

[54] METHOD AND APPARATUS FOR PERFORMING SYSTEM RESOURCE PARTITIONING

[75] Inventors: Peter J. Hancock, White Bear Lake; Ian R. Hepburn, Minnetonka; Lonny R. Lebahn, Saint Paul; Hans C. Mikkelsen, Afton; John A. Miller, Shoreview; Robert T. Sandelands, Stillwater; James F. Torgerson, Andover, all of Minn.

[73] Assignee: Unisys Corporation, Blue Bell, Pa.

[21] Appl. No.: 302,381

[22] Filed: Sep. 8, 1994

Related U.S. Application Data

[63] Continuation of Ser. No. 290, Jan. 4, 1993, abandoned.
[51] Int. Cl.$^6$ .................................................. G06F 9/00
[52] U.S. Cl. ........................ 395/650; 395/DIG. 1; 395/280; 395/281.3; 395/281.8
[58] Field of Search ................................. 395/650, 700

[56] References Cited

U.S. PATENT DOCUMENTS

| | | | |
|---|---|---|---|
| 3,641,505 | 2/1972 | Artz et al. | 340/172.5 |
| 3,812,469 | 5/1974 | Hauck et al. | 340/172.5 |
| 4,070,704 | 1/1978 | Calle et al. | 364/200 |
| 4,245,306 | 1/1981 | Besemer et al. | 364/200 |
| 4,437,157 | 3/1984 | Witalka et al. | 364/200 |
| 4,843,541 | 6/1989 | Bean et al. | 364/200 |
| 4,868,818 | 9/1989 | Madan et al. | 371/11.3 |
| 4,888,771 | 12/1989 | Benignus et al. | 371/16.1 |
| 4,891,810 | 1/1990 | de Corlieu et al. | 371/9.1 |
| 4,979,107 | 12/1990 | Advani et al. | 364/200 |
| 4,995,035 | 2/1991 | Cole et al. | 370/95.2 |
| 5,014,197 | 5/1991 | Wolf | 364/200 |
| 5,113,522 | 5/1992 | Dinwiddie et al. | 395/700 |
| 5,125,081 | 6/1992 | Chiba | 395/325 |
| 5,129,077 | 6/1992 | Hillis | 395/500 |
| 5,161,102 | 11/1992 | Griffin et al. | 395/800 |
| 5,165,018 | 11/1992 | Simor | 395/300 |
| 5,170,472 | 12/1992 | Cwiakala et al. | 395/275 |
| 5,253,344 | 10/1993 | Bostick et al. | 395/275 |

*Primary Examiner*—Kevin A. Kriess
*Attorney, Agent, or Firm*—Nawrocki, Rooney & Sivertson, P.A.

[57] ABSTRACT

An apparatus and method for managing a number of data processing resources to produce one or more independent and separate data processing partitions. Each partition is defined as a proper subset of the total inventory of available data processing resources. Each partition is controlled by a system control facility. All system control facilities communicate with a site configuration management system, which defines and redefines the composition of each partition. The site configuration management system can move resources from one partition to another as required. Preferably, the system control facilities and the site configuration management system are industry standard personal computers which communicate via a local area network.

31 Claims, 13 Drawing Sheets

METHOD AND APPARATUS FOR PERFORMING SYSTEM RESOURCE PARTITIONING

CROSS-REFERENCE TO APPLICATIONS

This is a continuation of U.S. application Ser. No. 08/000,290 filed Jan. 4, 1993, now abandoned.

Commonly assigned U.S. patent application Ser. No. 07/762,276, filed on Sept. 18, 1991 in the name of Tsuchiya et al., and entitled "DATA COHERENCY PROTOCOL FOR MULTI-LEVEL CACHED HIGH PERFORMANCE MULTIPROCESSOR SYSTEM" is incorporated herein by reference.

BACKGROUND OF THE INVENTION

1. Field of the Invention

The present invention generally relates to digital data processing systems and more particularly relates to multiple digital data processing systems, which may be reconfigured.

2. Description of the Prior Art

The earliest digital data processing systems tended to employ fixed configurations with regard to processing resources. The memory spaces were of fixed dimensions, the input\output channels were hardwired and/or hard coded, and specific peripheral equipments were identified to the operating software with fixed characteristics.

As data processing systems grew in complexity and capability, resources were given more relative and logical, rather than fixed and specific characteristics. A major step was providing input/output subchannels with the capability of dynamic allocation as taught in U.S. Pat. No. 4,437,157, issued to Witalka et al. Logical file designations for peripheral devices is suggested by U.S. Pat. No. 5,014,197, issued to Wolf. Similarly, U.S. Pat. No. 4,979,107, issued to Advani et al., suggests logical assignment of peripheral subsystem operating parameters.

The capability to reconfigure has been used in a number of systems applications. U.S. Pat. No. 4,070,704, issued to Calle et al., provides a boot strap program with the capability to change the initial load peripheral device upon determination of a failure in the primary loading channel. Perhaps the most often stated purpose for reconfiguration is to provide some degree of fault tolerance. U.S. Pat. No. 4,891,810, issued to de Corlieu et al., and U.S. Pat. No. 4,868,818, issued to Madan et al., suggest system reconfiguration for that reason. A related but not identical purpose is found in U.S. Pat. No. 4,888,771, issued to Benignus et al., which reconfigures for testing and maintenance.

The capability to reconfigure a data processing system can support centralized system control as found in U.S. Pat. No. 4,995,035, issued to Cole, et al. A current approach is through the assignment of logical names for resources as found in U.S. Pat. No. 4,245,306, issued to Besemer et al. and U.S. Pat. No. 5,125,081, issued to Chiba. An extension of the capability to identify resources by logical names is a virtual system in which the user need not be concerned with physical device limitations, such as suggested in U.S. Pat. No. 5,113,522, issued to Dinwiddie, Jr. et al.

Though the prior art does show some of the rudiments of system reconfiguration, the focus tends to be upon a single integrated system with resources being added or deleted. A primary advantage in reconfiguration of resources is when managing multiple systems to accommodate resources which may be more globally shared.

SUMMARY OF THE INVENTION

The present invention overcomes the disadvantages of the prior art by providing a dynamic reconfiguration capability which supersedes the boundaries of a single data processing system. In this way resources can be assigned to a number of otherwise autonomous systems using a centralized control entity.

The data processing resources used with the present invention, including instruction processors, memory modules, input/output controllers, peripheral devices, software, etc., are configured by a centralized site configuration management system into a plurality of separate and autonomous data processing systems. Each of these data processing systems, called partitions, is assigned to perform a number of different tasks, and each partition is provided an appropriate portion of the total resources to perform these tasks. Following partitioning, each separate system (i.e. partition) operates, subject to a dedicated system control facility, totally asynchronously of the other partitions. Reconfiguration within a partition may be employed to accommodate changes in loading, maintenance, etc. within that partition.

As overall task loading, component failures, and maintenance requirements change, the centralized site configuration management system is capable of moving resources from one partition to another. To do so, the dedicated system control facility of the partition to which the resource is currently assigned is notified. That dedicated system control facility commands the executive of the partition to deactivate the resource. After this has been accomplished, the definition of that partition is modified to remove the subject resource assignment.

Following removal of the resource from a previous partition, that resource can then be reassigned to a different partition. To do so, the centralized site configuration management system assigns the resource to the alternate partition and notifies the dedicated control facility of the alternate partition concerning the availability of the resource. The dedicated control facility is then free to command the executive of the alternate partition to activate the resource.

In accordance with the present invention, the centralized site configuration management system can exercise configuration and reconfiguration control over all resources at a given site or group of related sites. This permits resources to be assigned and reassigned amongst otherwise separate and autonomous systems.

BRIEF DESCRIPTION OF THE DRAWINGS

Other objects of the present invention and many of the attendant advantages of the present invention will be readily appreciated as the same becomes better understood by reference to the following detailed description when considered in connection with the accompanying drawings, in which like reference numerals designate like parts throughout the figures thereof and wherein.

DETAILED DESCRIPTION OF THE PREFERRED EMBODIMENTS

The preferred embodiments of the present invention relate specifically to the Model 2200/900 system available from Unisys Corporation. However, those of skill in the art will be readily able to apply the teachings found herein to other hardware and software systems.

Figure 1:
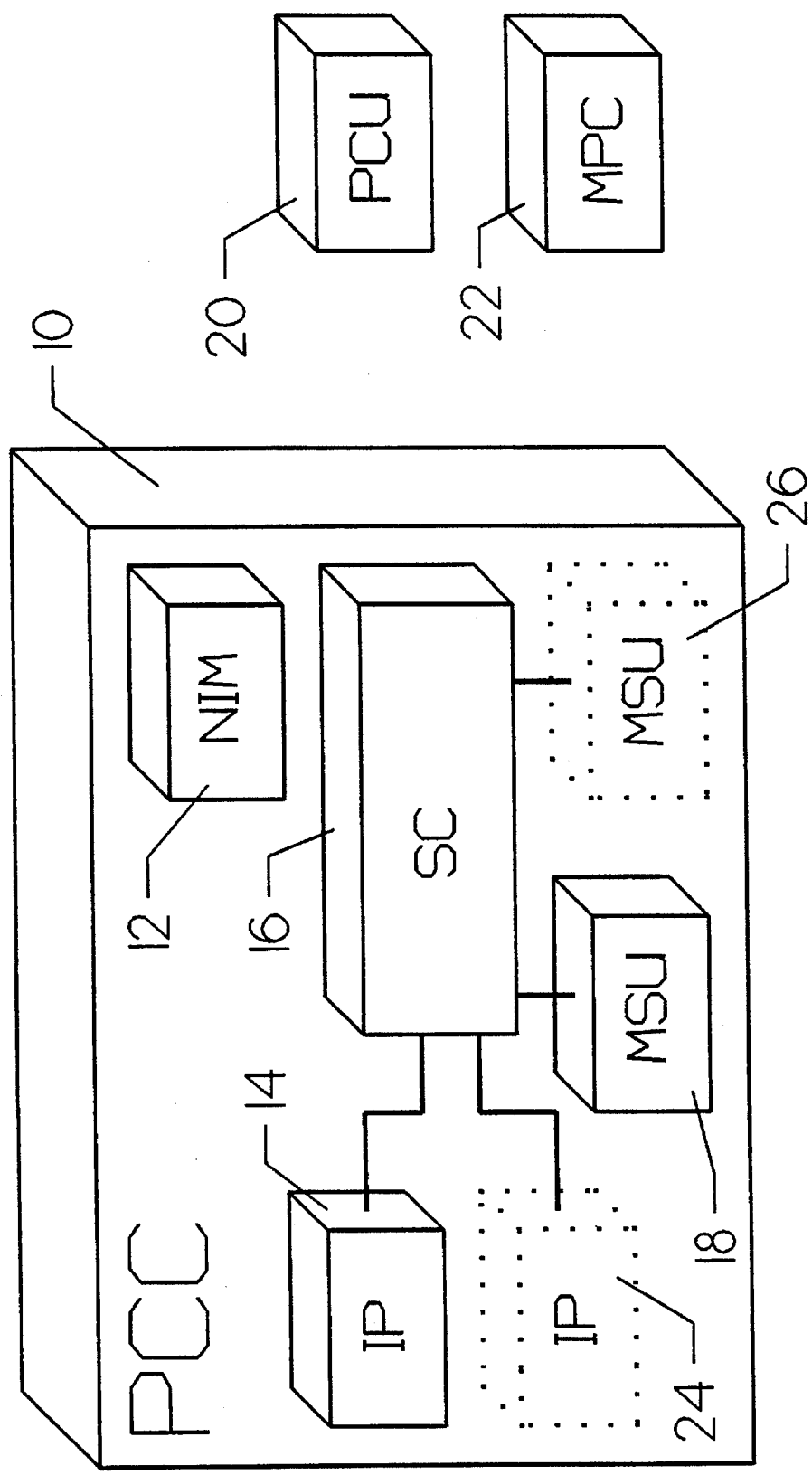
FIG. 1 is a block diagram of the resources associated with a processing complex cabinet in accordance with the preferred embodiment of the present invention.

FIG. 1 is a block diagram of a single processing complex cabinet 10 of the preferred embodiment of the present invention. Supporting processing complex cabinet 10 and external to it are processor cooling unit 20 and modular power unit 22. Processor cooling unit 20 provides liquid cooling for processing complex cabinet 10. Similarly, modular power unit 22 provides processing complex cabinet 10 with its electrical supply having the proper voltages, filtering, etc.

Processing complex cabinet 10 includes instruction processor 14 which performs execution of the software within the system.. Processing complex cabinet 10 may also contain a second optional instruction processor 24. Storage controller 16 supplies the interface between instruction processor 14 (and optional instruction processor 24 if present) and other system components including memory, input/output controllers, and other processing complex cabinets. The above referenced and commonly assigned U.S. Patent Application provides additional detail on the construction and operation of storage controller 16.

Memory storage unit 18 is the main memory for processing complex cabinet 10. An optional memory storage unit 26 may also be provided. Network interface module 12 supplies the interface between processing complex cabinet 10 and the system control facility as described in greater detail below. It is through network interface module 12 that reconfiguration commands and status information are exchanged between the executive and the operator. Again, the nature of this interface is treated in detail below.

Figure 2:
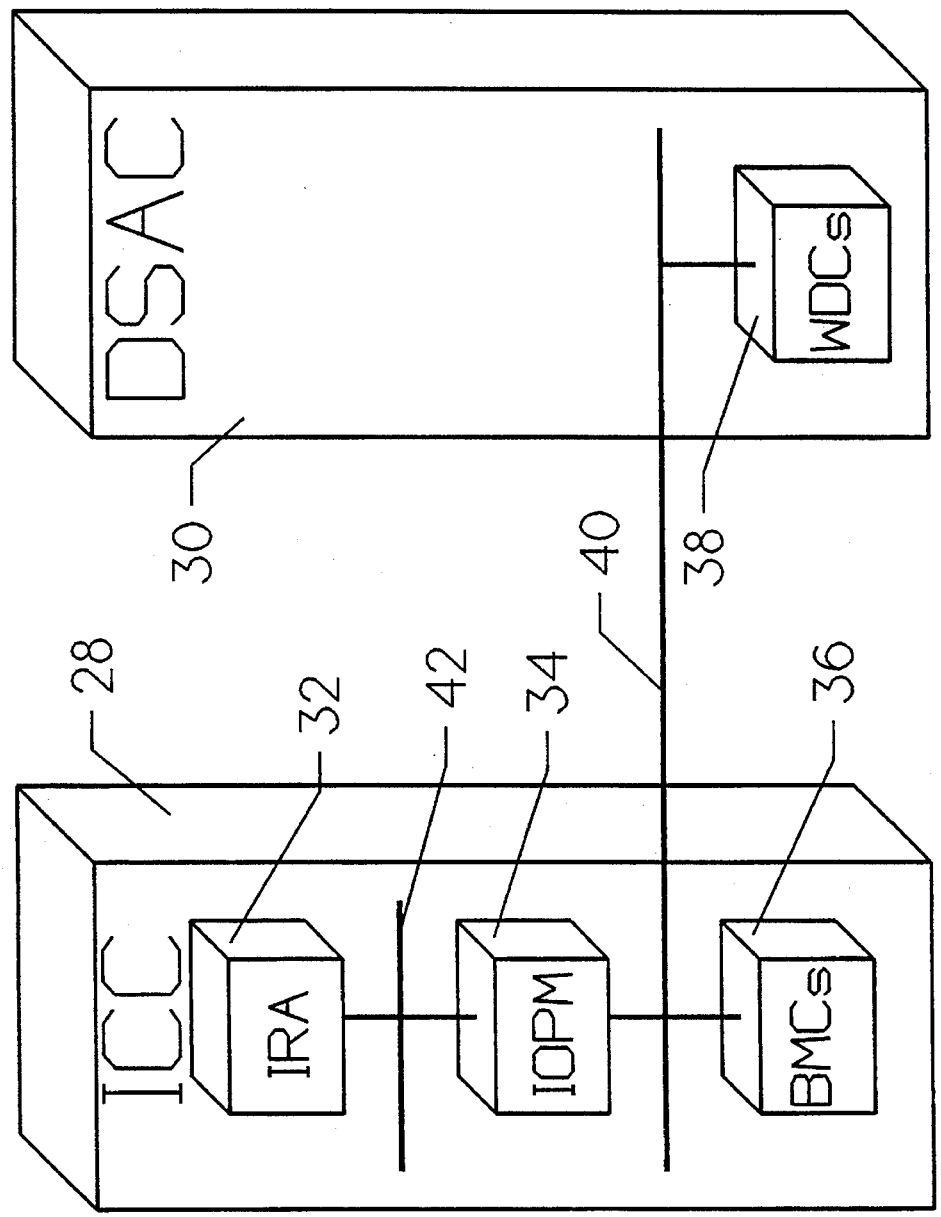
FIG. 2 is a block diagram of the basic input/output controller resources.

FIG. 2 is a block diagram of the input/output complex of the preferred mode system. It consists of input/output complex cabinet 28 and one or more disk subsystem adapter cabinet(s) 30. Input/output complex cabinet 28 interfaces with processing complex cabinet 10 via input/output remote adapter 32, which couples to memory bus 42 providing the main control interface. Also coupled to memory bus 42 is one or more input/output processor module(s) 34, which actually control data transfers between memory bus 42 and an individual input/output channel.

Data bus 40 provides the main input/output device data path within the input/output controller. Block multiplexer channel(s) 36 provide the electrical interface to the individual peripheral devices. Similarly, word data channel(s) 38 provide electrical interface for the transfer of read and write disk data.

Figure 3:
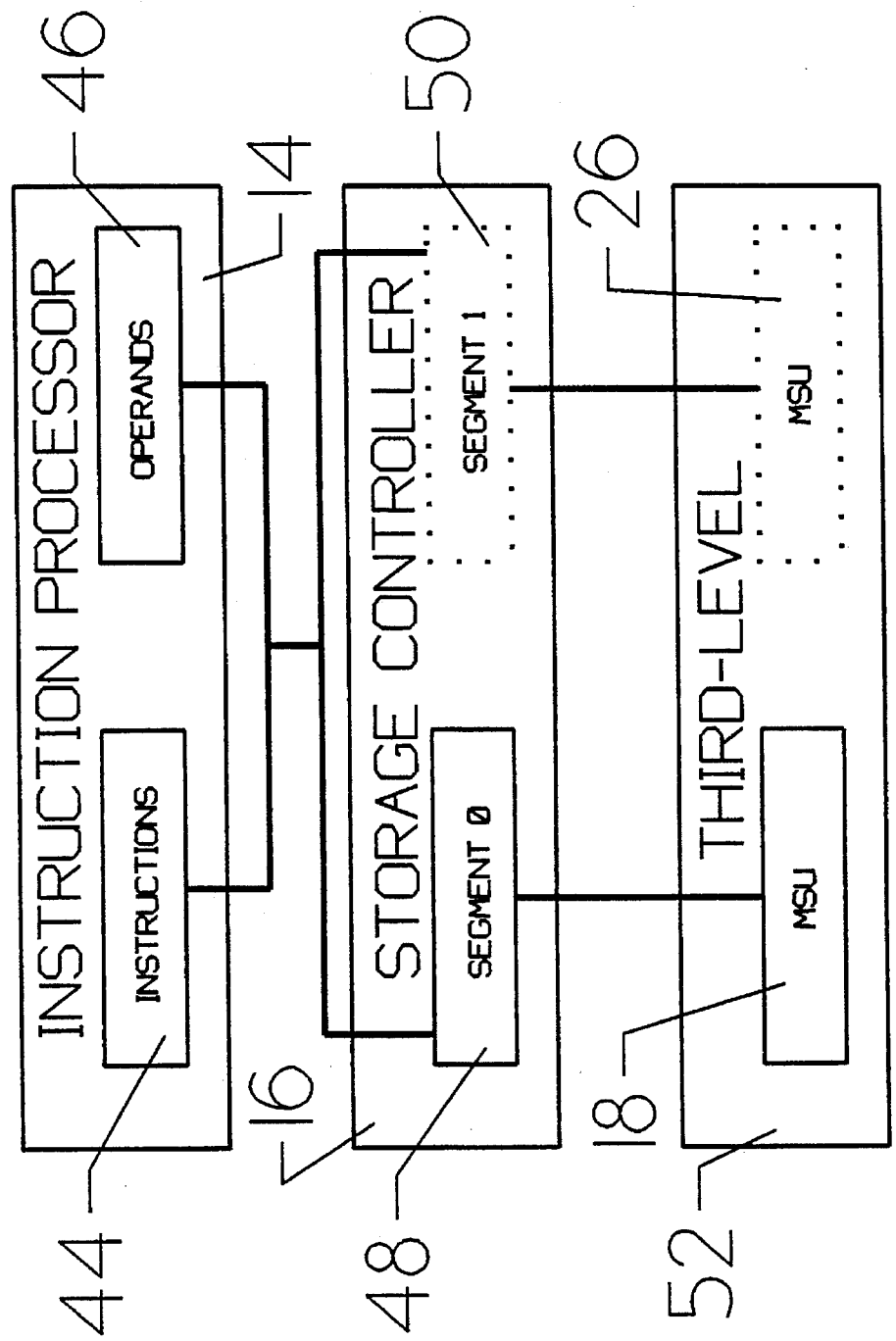
FIG. 3 is a block diagram showing the storage hierarchy.

FIG. 3 is a block diagram of the interface between instruction processor 14 and memory storage unit 18 and optional memory storage unit 26 (see also FIG. 1). Instruction processor 14 has two internal and dedicated cache memories consisting of instruction cache 44 and operand cache 46. The overlap operation of instruction processor 14 is enhanced by having two caches dedicated in this manner.

All memory requests made from instruction processor 14 to memory storage unit 18 and optional memory storage unit 26 are via storage controller 16. Internal to storage controller 16 is a cache memory dedicated to each of the memory storage units contained within memory subsystem 52. Cache 48 is dedicated to memory storage unit 18. Similarly, optional cache 50 is dedicated to optional memory storage unit 26.

Figure 4:
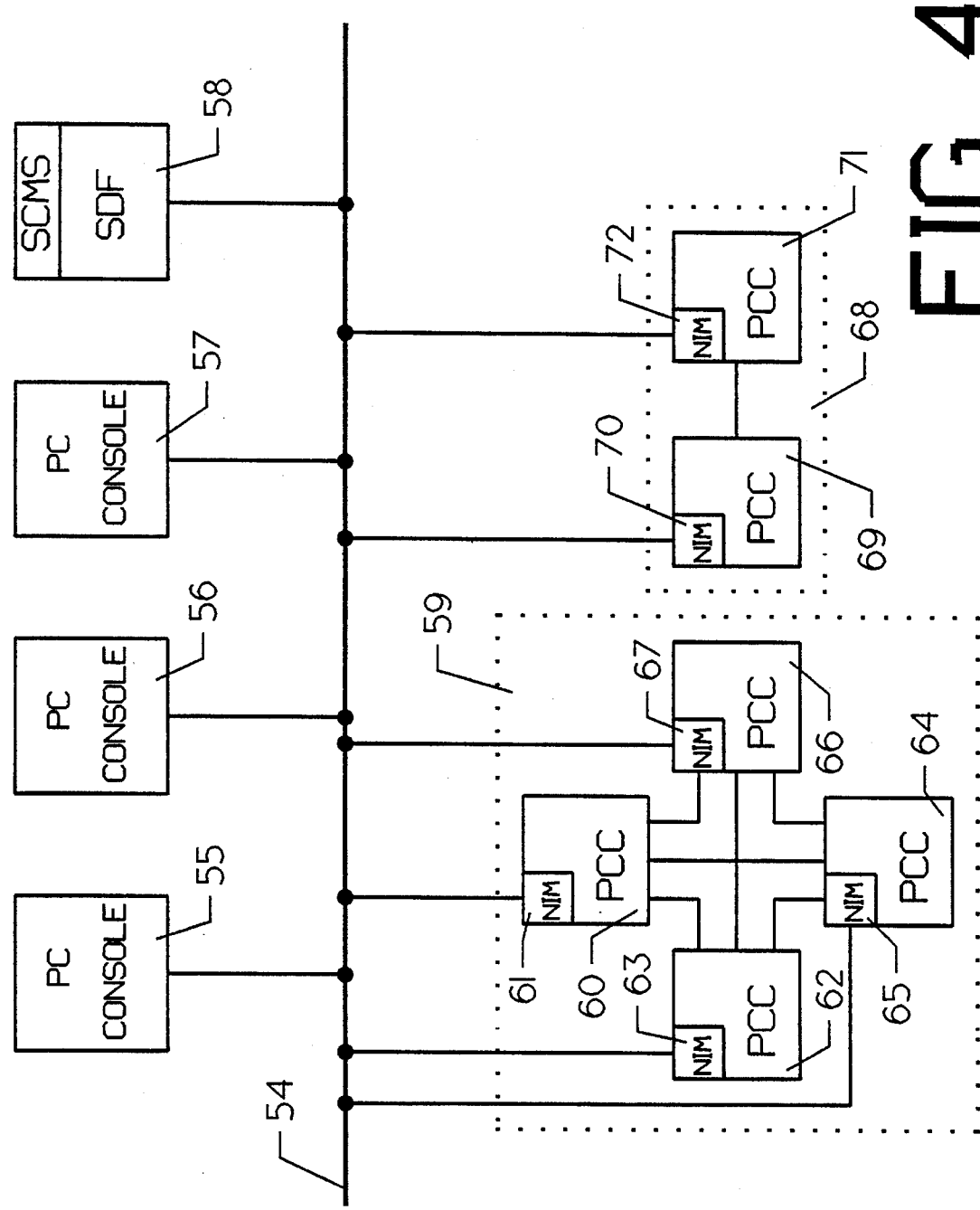
FIG. 4 is a block diagram showing the coupling of the control facility components.

FIG. 4 is a block diagram of the components associated with system control for a given site having data processing system 59 and data processing system 68. For this example, data processing system 59 contains processing complex cabinets 60, 62, 64, and 66 coupled to IEEE Standard 802.5 Token Ring Local Area Network (LAN) 54 via network interface modules 61, 63, 65, and 67, respectively. Similarly, data processing system 68 contains processing complex cabinets 69 and 71 coupled to LAN 54 via network interface modules 70 and 72, respectively.

Consoles 55, 56, 57, and 58 are industry compatible micro computers using the SCO XENIX application operating environment. These four consoles couple to data processing systems 59 and 68 via LAN 54. Consoles 55 and 56 are utilized to control data processing system 59. As such, consoles 55 and 56 exercise control only over resources and functions of data processing system 59. The function of console 57 is limited to control of data processing system 68. Console 58 functions as the site data facility (SDF) on which the site configuration management system (SCMS) resides. Therefore, console 58 has control over resources and functions of both data processing system 59 and data processing system 68.

The use of industry compatible micro computers is a convenient means of implementing the preferred embodiment of the present invention. However, this is not to be deemed limiting of the present invention. Those of skill in the art will readily appreciate that these functions can be performed with other hardware and software elements.

Figure 5:
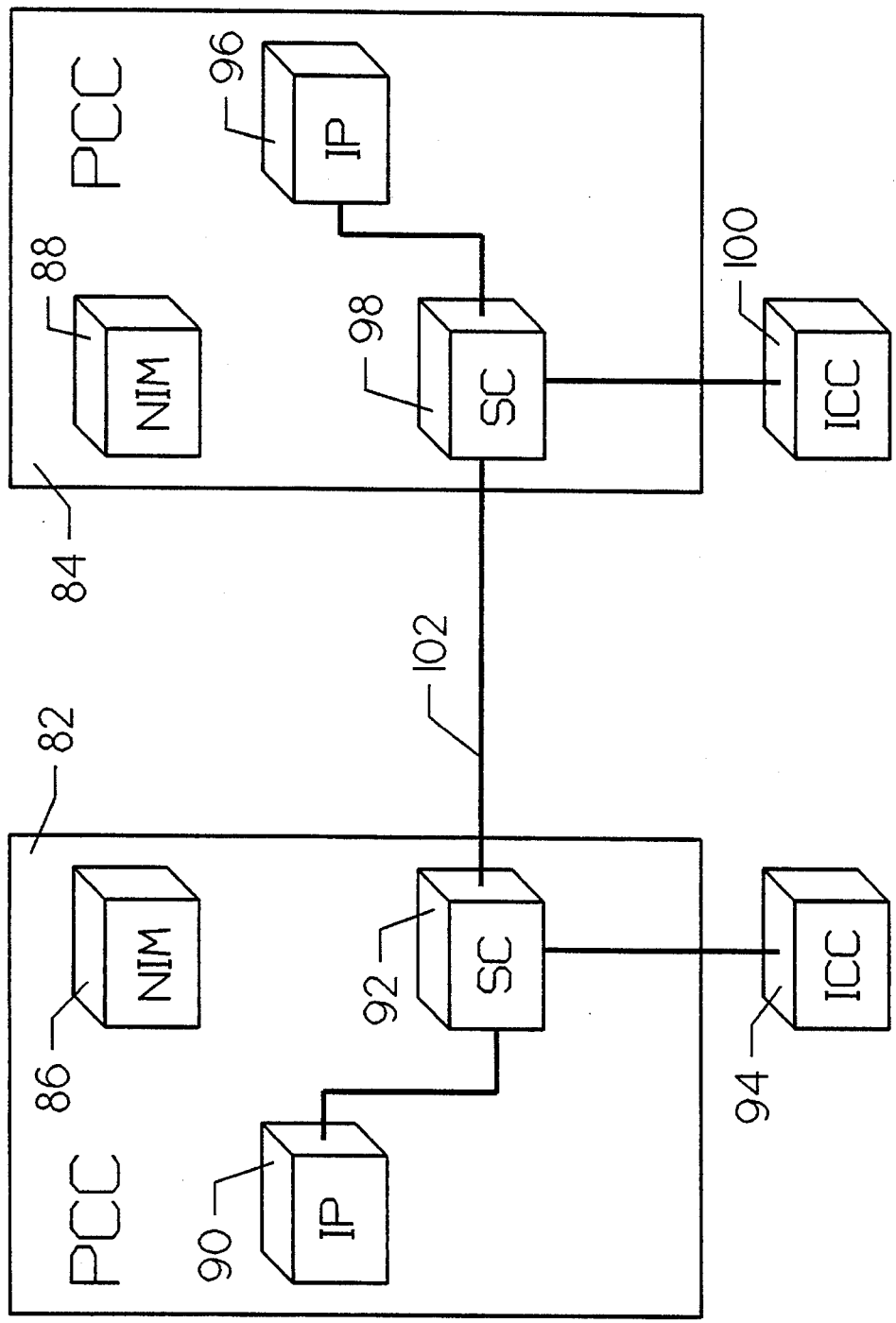
FIG. 5 is a block diagram showing coupling of two processing complex cabinets into a single system.

FIG. 5 is a block diagram showing the coupling of two processing complex cabinets to form a two PCC partition. In this particular configuration, processing complex cabinet 82 is populated with instruction processor 90, network interface module 86, and storage controller 92. Input/output complex cabinet 94 couples to storage controller 92. Similarly processing complex cabinet 84 contains network interface module 88, instruction processor 96, and storage controller 98. Input/output complex cabinet 100 interfaces with storage controller 98.

Coupling between the two processing complex cabinets is via cable 102. This interface is between storage controller 92 and storage controller 98. This interface permits instruction processor 90 to communicate with the memory module(s) (not shown) of processing complex cabinet 84. Similarly, instruction processor 96 can access the memory module(s)

(not shown) of processing complex cabinet 82 via cable 102. Thus instruction processor 90 and instruction processor 96 can effectively operate as a multiprocessor system. Note that processing complex cabinets 82 and 84 each have the capability to add an additional instruction processor (see also FIG. 1) to create a four processor system. Further details concerning the operation of storage controllers 92 and 98 is available in the above referenced and incorporated commonly assigned U.S. Patent Application.

Figure 6:
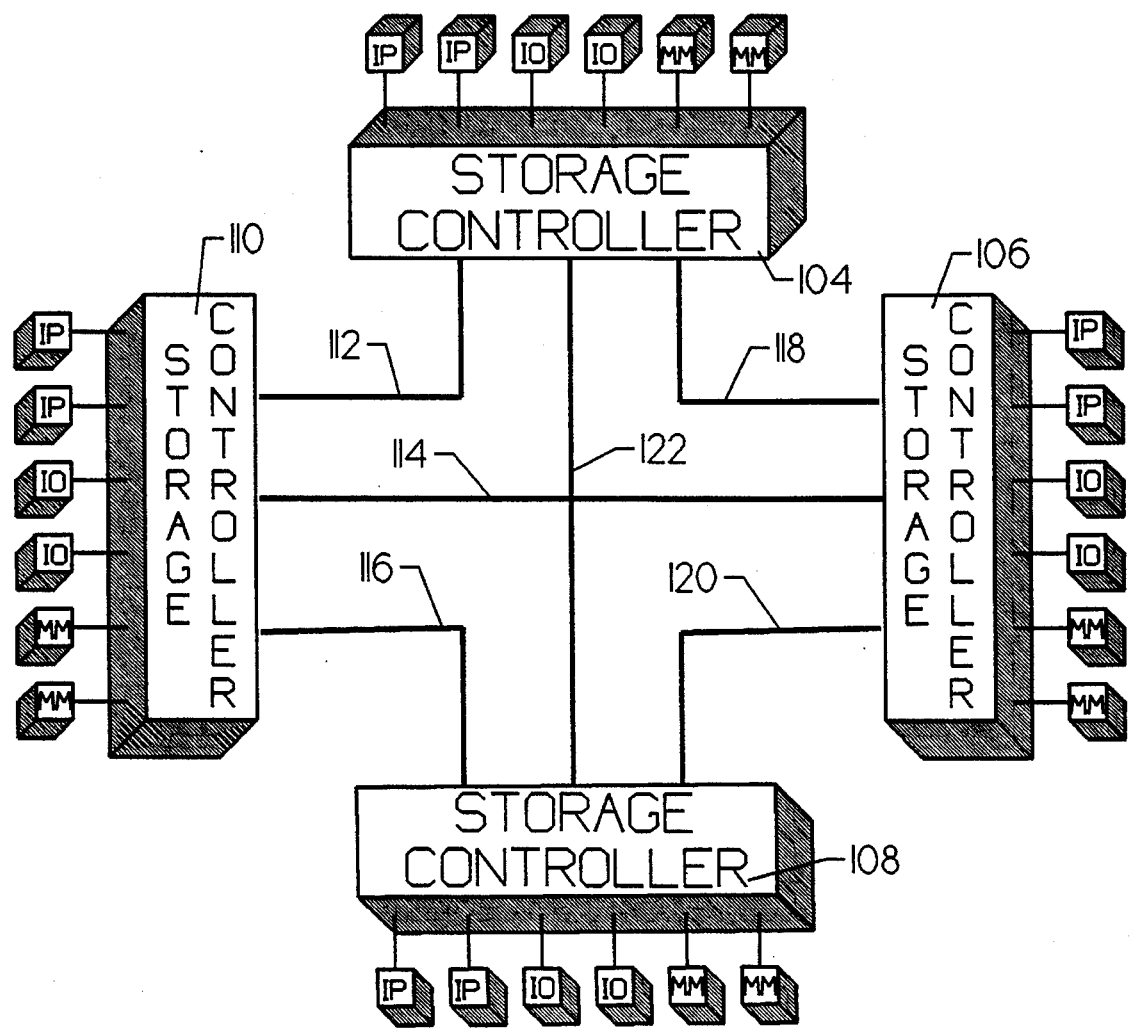
FIG. 6 is a block diagram showing the major components of a fully populated hardware complex.

FIG. 6 is a block diagram showing a fully populated Unisys Corporation Model 2200/900 data processing complex. Each of storage controllers 104, 106, 108, and 110 is coupled to two instruction processors, two input/output complex cabinets, and two memory modules. Cables 112, 114, 116, 118, and 120 provide point-to-point interface amongst all four storage controllers. Through these six bidirectional cables, every resource can communicate with every other resource. As a single partition, this configuration produces an eight instruction processor system. Several smaller partitions are created by functionally disabling various combinations of cables 112, 114, 116, 118, 120, and 122.

Figure 7:
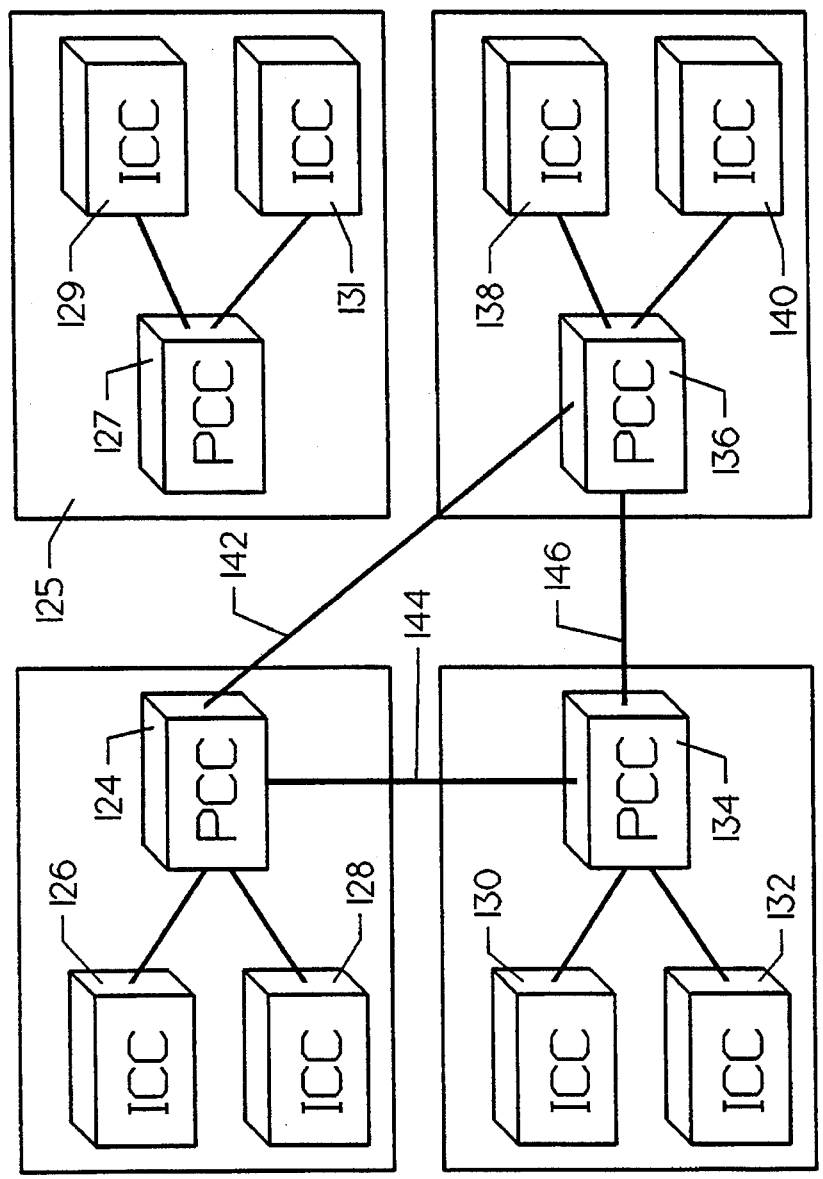
FIG. 7 is a block diagram showing typical partitioning of a fully populated hardware complex.

FIG. 7 is a block diagram showing an example of partitioning of the resources of FIG. 6 into two separate partitions. Partition 125 is the smaller partition. It consists of processing complex cabinet 127 and input/output complex cabinets 129 and 131. This partition results from functionally (i.e. physically and/or electrically) disabling communication between the storage controller (not shown in this view) of processing complex cabinet 127 and all other storage controllers (see also FIG. 6).

The larger partition exists through the coupling of the storage controllers (not shown) of processing complex cabinets 124, 134, and 136 via cables 142, 144, and 146. This partition provides intercommunication amongst all of the resources of processing complex cabinets 124, 134, and 136 and input/output complex cabinets 126, 128, 130, 132, 138, and 140 (see also FIG. 6).

Figure 8:
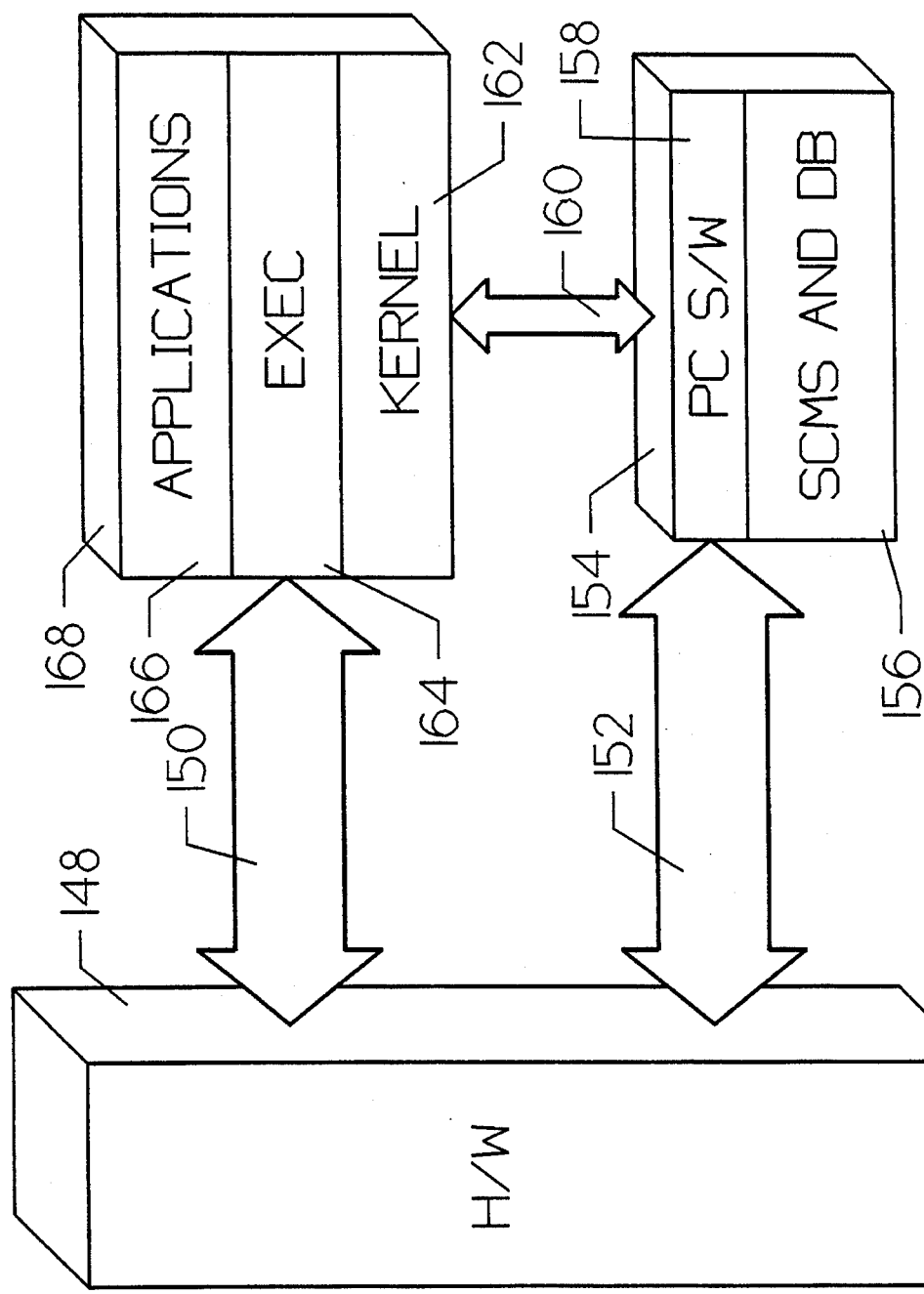
FIG. 8 is a schematic diagram showing control facility paths within a partition.

FIG. 8 is a schematic diagram showing the logical coupling of the system control elements. Hardware resources 148 operate under software control as symbolized by arrow 150. The software package consists of the applications programs 168 performing under the executive program 164, which is controlled by the executive kernel 162.

The hardware resource data base of executive kernel 162 is maintained in part by the software 158 of the system console, which is an industry compatible personal computer. This control interface, symbolized by arrow 160, utilizes the network interface module (see also FIG. 1) to communicate with the software of executive kernel 162. Site configuration management system and data base 156 contains the definition of the corresponding partition and characteristics of the resources associated therewith. Changes to the partition definition and/or any resources associated therewith are first made to site configuration management system and data base 156 before actual changes to executive kernel 162. Arrow 152 symbolizes sensing and control of the physical environment of hardware resources 148 via processor cooling unit 20 and modular power complex 22 (see also FIG. 1) and control of those resources via the network interface module.

Figure 9:
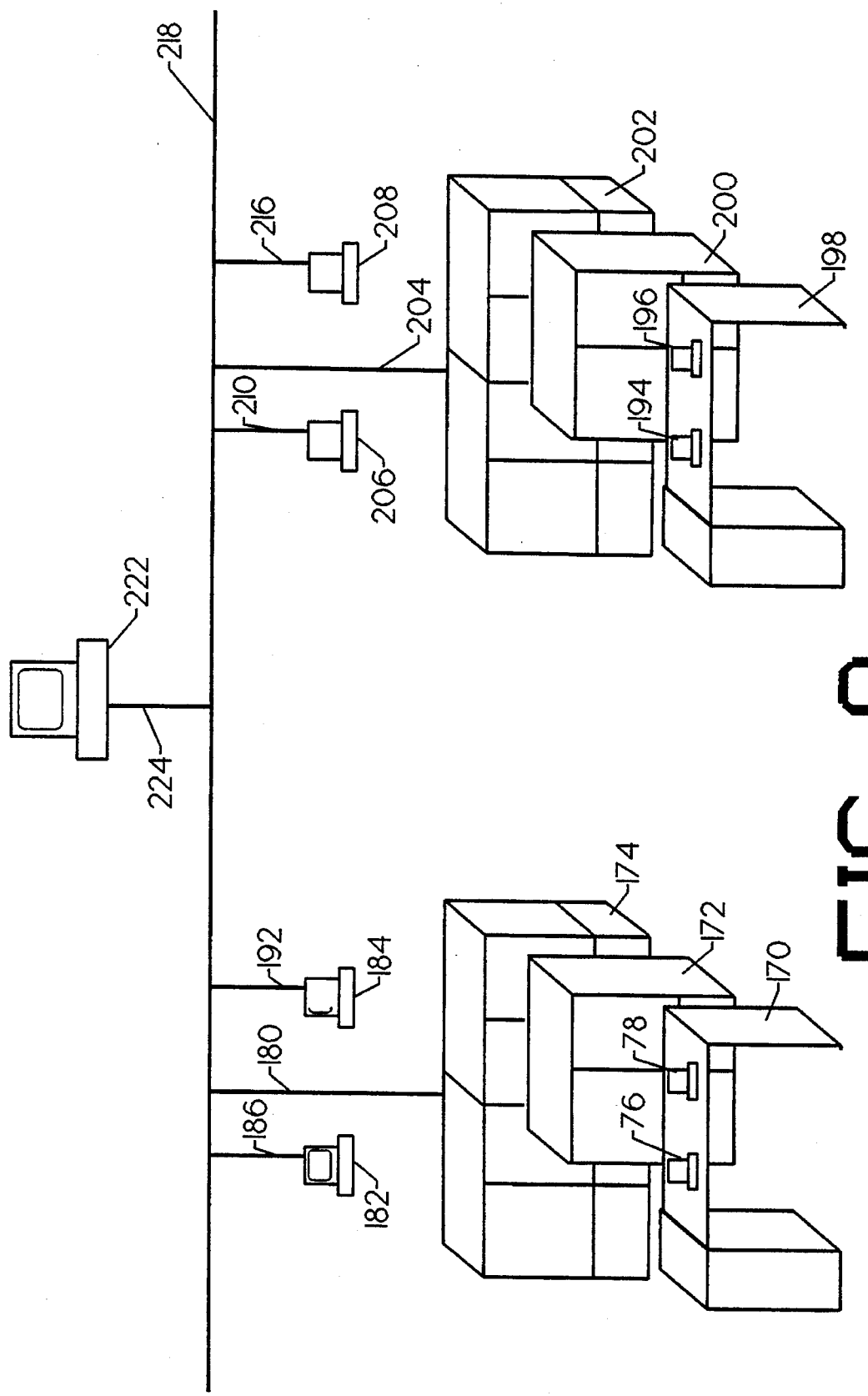
FIG. 9 is a diagram showing the physical elements of a typical hardware complex.

FIG. 9 is a pictorial diagram showing the physical elements of a typical system. System console 170, containing personal computers 176 and 178, provides direct control to hardware resources 172 and 174. Similarly, system console 198, containing personal computers 194 and 196, provides control over hardware resources 200 and 202.

System console personal computers 176, 178, 194, and 196 are coupled (using cables not shown for clarity), along with system console personal computers 182, 184 206, and 208 (which similarly control other hardware resources not shown), via cables 186, 192, 210, and 216 to system control facility local area network 218. This local area network permits intercommunication of all system control resources within the entire site. Site Data Facility personal computer 222, coupled to local area network 218 via cable 224, functions as the site configuration management system for defining and redefining the partitions and the assigned resources thereof for the entire data processing site. The operation of this control position is discussed in greater detail below.

Figure 10:
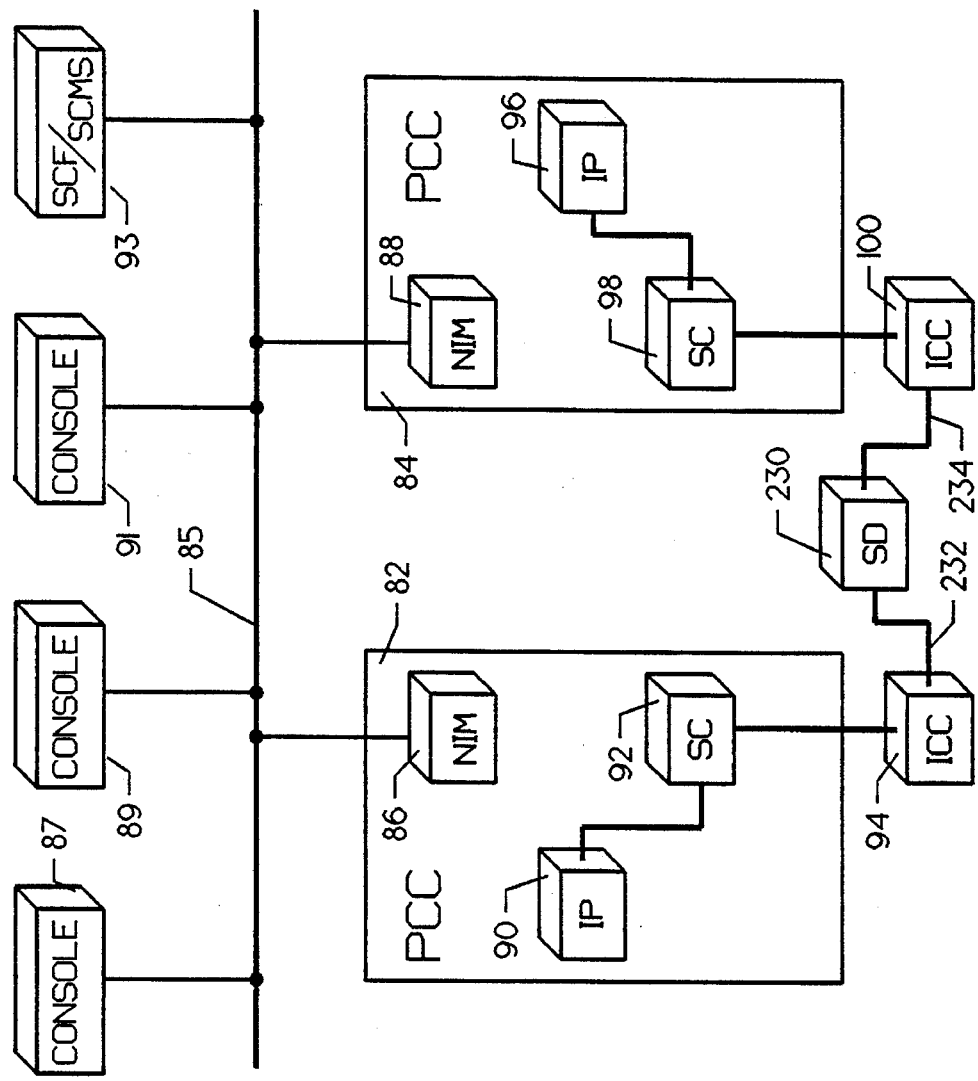
FIG. 10 is a block diagram showing physical connection of a reassignable resource.

FIG. 10 is a block diagram showing the physical coupling required to permit reassignment of a peripheral device from one partition to another. The peripheral device to be assigned and reassigned is sample device 230, which can be a storage device, input device, output device, etc. Sample device 230 couples to partition 82 via cable 232 and input/output complex cabinet 94 and couples to partition 84 via cable 234 and input/output complex cabinet 100. All other elements are as previously defined. However, unlike the configuration of FIG. 5, cable 102 coupling storage controller 92 to storage controller 98 has been removed. Whether this removal is physical or only logical, the result is that partition 82 and partition 84 function totally independently.

For sample device 230 to be used by one of partitions 82 or 84, it must not be accessible by the other. This provides independent operation of the partitions. Under certain circumstances, a device can be shared between partitions, but only if the device is defined to the executive programs of both partitions as a "shared" resource. Dedicated assignment to partition 82 involves providing identification of sample device 230 and its characteristics to the executive kernel of partition 82 via network interface module 86 (see also FIG. 8). Because sample device 230 is physically coupled with partition 82 as discussed above, it is available to function under control of partition 82 after activation.

Dedicated reassignment of sample device 230 to partition 84 requires that it first be deactivated from partition 82 and removed from its available device list. Following such deactivation, it is available for dedicated reassignment to partition 84 via network interface module 88 as previously described.

Figure 11:
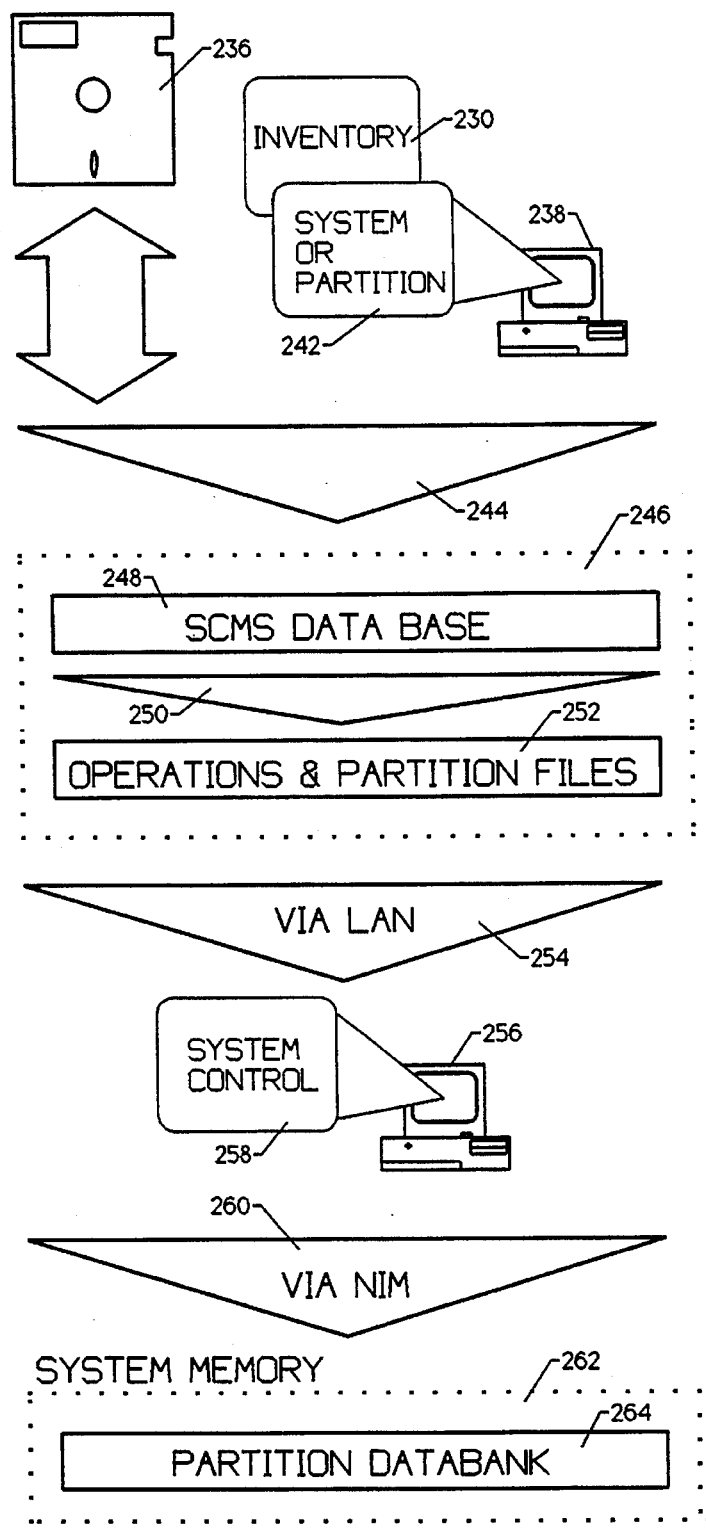
FIG. 11 is a schematic diagram showing the control path from the centralized control facility to the hardware within a given partition.

FIG. 11 is a schematic diagram showing the partition definition function. The initial factory resource data base is provided on floppy disk 236, which is loaded at 244 into site configuration management system data base 248 of personal computer 238 memory 246. The operator may use personal computer 238 to access various menus including inventory 230 and system or partition 242. Using these menus, the operator can add, delete, and partition the resources by varying site configuration management system data base 248.

Processing 250 within personal computer 238 uses the data of site configuration management system data base 246 to verify, lock, unlock, and prepare partition definitions for the data processing system. This results in the operations and partition files 252, which define the operational status and interconnection of the system elements. This process occurs at initial system boot and subsequently, as conditions require, during redefinition or repartitioning.

The operations and partition files 252 are communicated via the local area network at element 254 (see also FIG. 10) to the personal computers which serve as system consoles as represented by personal computer 256. The operator of personal computer 256 is permitted to use menus, such as menu 258, to activate and deactivate resources assigned to the corresponding partition.

Interaction with the data processing system is via the network interface module at element 260. This loads the partition data bank 264 within the system memory 262 of the 2200/900 data processing complex. In this manner, personal computer 238 is able to inform the executive kernel of all the hardware resources that are available in the partition. Furthermore, personal computer 256 provides an intermediate level of control, which can activate, deactivate, and rearrange all resources assigned to the corresponding partition.

Figure 12:
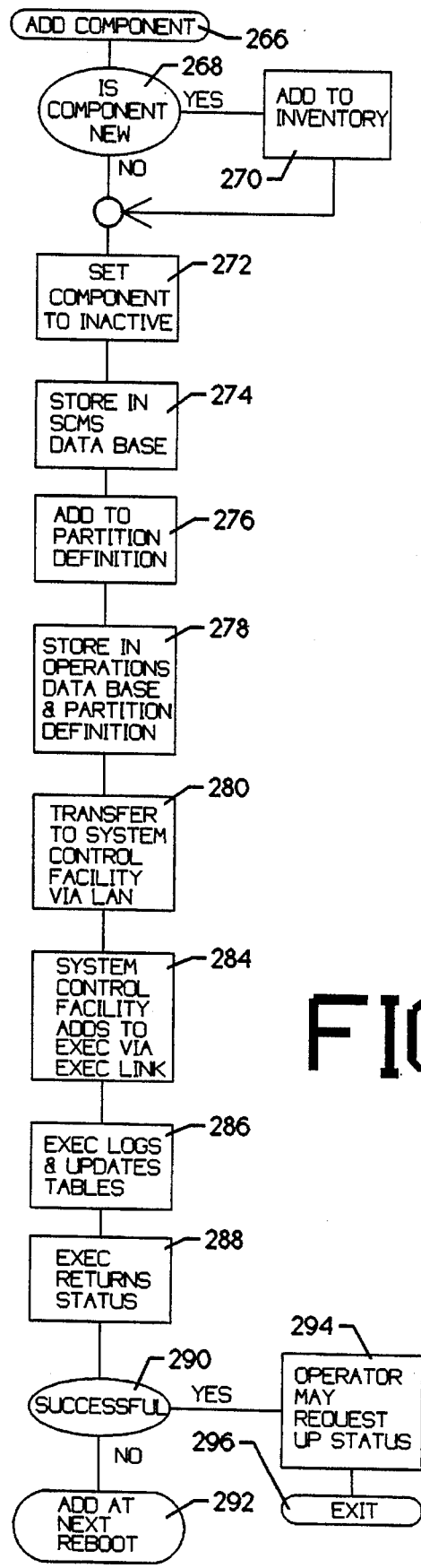
FIG. 12 is a flow chart showing the steps in adding a resource to a partition.

FIG. 12 is a flow chart of the method of adding a component to a given partition, which requires that the component is not currently active in any other partition. Entry is via manual operator request (keyin) to element 266. Element 268 determines whether the component is in the current inventory. If not, element 270 adds the component to the inventory. Element 272 sets the current status of the component to inactive.

Element 274 stores the identity of the component in the appropriate location of the site configuration management system data base. The component is added to the assigned partition at element 276. The component characteristics are then stored in the operations data base of the partition at element 278 (see also FIG. 11). The data, along with notification of the change, is transferred to the selected system control facility via the local area network at element 280.

Element 284 adds the logical name and component characteristics to the executive data base via executive link which utilizes the network interface module (see also FIG. 11). At element 286, the internal data base of the executive is updated, and the executive program reports the new system status to the system control facility at element 288. If the resource allocation operation has been successful as noted by the status returned by the executive program, control is given to element 294 for activation of the new component under operator control. Operator input is required at this point because the newly added component may not be physically ready for use even though the logical connection has been made. The component is brought up under operator control in the known fashion. Normal exit is via element 296. If the addition has not been successful (i.e., the abnormal exit at element 292) the new component will need to be added during the next reboot of the system. Ordinarily a reboot will not be accomplished immediately unless the component is of critical importance. More often, the component will simply be added at the next necessary or scheduled reboot. This may result from the need to employ the new component within the system or may be normal scheduled maintenance.

Figure 13:
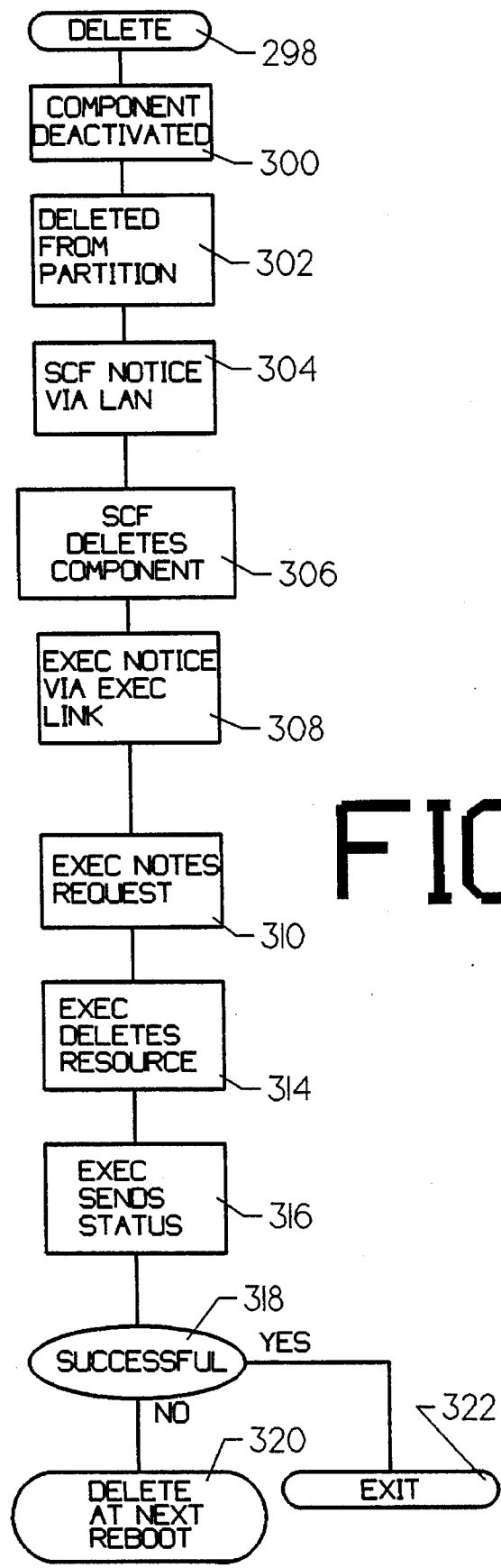
FIG. 13 is a flow chart showing the steps in deleting a resource from a partition.

FIG. 13 is a flow chart of the operations performed in deleting a component from a particular partition. Entry is via manual operator request at element 298. The component is deactivated at element 300 by operator action at the appropriate console. Deactivation notifies the executive program that the component is no longer available for system use. Element 302 involves deletion of the component from the partition data base by the site administrator. The system control facility of the assigned partition is notified via the network interface module couple to the local area network (see also FIG. 11) at element 304. The logical name of the resource is used to delete the component by the system control facility at element 306. This logical name is utilized by the system control facility at element 308 to notify the executive program of the deletion via the network interface module.

At element 310, the executive program notes the deletion request. Element 312 verifies that use of the resource is completed. Following verification, the resource is deleted by the executive at element 314. The executive sends the status information to the system control facility at element 316. Element 318 determines whether the deactivation was successful from this status information. If yes, a normal exit is made at element 322. If no, abnormal exit is via element 320, which requires a reboot to the system to deactivate the resource. Again, the reboot will not normally occur immediately. However, the deletion will ordinarily be made at the next reboot opportunity.

Having thus defined the preferred embodiments of the present invention, those of skill in the art will be readily able to apply the teachings found herein to yet other embodiments within the scope of claims hereto attached and wherein:

We claim:

1. A method of having a computer device dynamically partition a plurality of data processing resources among a number of separate and autonomous data processing systems, each of the number of separate and autonomous data processing systems having a corresponding system control facility for controlling the plurality of data processing resources dynamically partitioned thereto, comprising:
   a. making an inventory of the plurality of data processing resources; and
   b. dynamically partitioning selected ones of the plurality of data processing resources among the number of separate and autonomous data processing systems, said dynamic partitioning step being performed by the computer device wherein the computer device uses said inventory to select the selected ones of the plurality of data processing resources.

2. A method according to claim 1 further comprising:
   a. adding a first one of the plurality of data processing resources to said inventory of said plurality of data processing resources; and
   b. adding said first one of the plurality of data processing resources to a selected one of said number of separate and autonomous data processing systems, whereby said first one of the plurality of data processing resources is controlled by a corresponding system control facility.

3. A method according to claim 1 further comprising:
   a. deleting a second one of the plurality of data processing resources from a one of said number of separate and autonomous data processing systems; and
   b. deleting said second one of the plurality of data processing resources from said inventory of the plurality of data processing resources.

4. A method for dynamically adding one of a plurality of resources having predefined characteristics to one of a plurality of separate and independent data processing partitions using a digital computer, each of the plurality of separate and independent data processing partitions having a corresponding system control facility, the one of the plurality of resources having a corresponding status and a corresponding identity, comprising:
   a. adding the one of the plurality of resources to an inventory table within a centralized site configuration management system;
   b. setting the status associated with the one of the plurality of resources to an inactive state;

c. storing the identity of the one of the plurality of resources within a centralized site configuration management system;

d. selecting one of the plurality of separate and independent data processing partitions;

e. adding the one of the plurality of resources to a partition file, wherein the partition file corresponds to the selected one of the plurality of separate and independent data processing partitions;

f. storing the predefined characteristics of the one of the plurality of resources in an operations file, wherein the operations file corresponds to the selected one of the plurality of separate and independent data processing partitions;

g. generating a notification after the storing step (f) is complete;

h. transferring the information contained in the operations file, the partition file and the notification to a system control facility associated with the selected one of the plurality of separate and independent data processing partitions;

i. adding the transferred information contained in the operations file, partition file and notification to a data base contained within the selected one of the plurality of separate and independent data processing partitions; and j. reporting to the system control facility within the selected one of the plurality of separate and independent data processing partitions when the adding step (i) is complete.

5. A method for dynamically deleting one of a plurality of resources having predefined characteristics from one of a plurality of separate and independent data processing partitions using a digital computer, each of the plurality of separate and independent data processing partitions having a corresponding system control facility and a corresponding partition file, the corresponding partition file being part of a centralized site configuration management data base, comprising:

a. deleting the one of the plurality of resources from partition file, wherein the corresponding partition file corresponds to the one of the plurality of separate and independent data processing partitions in which the one of the plurality of resources is currently assigned;

b. notifying the corresponding system control facility that the one of the plurality of resources is no longer available;

c. notifying the one of the plurality of separate and independent data processing partitions via the corresponding system control facility that the one of the plurality of resources is no longer available;

d. verifying that the one of the plurality of resources is not being used by the one of the plurality of separate and independent data processing partitions notified in step c is complete;

e. deleting the one of the plurality of resources from the one of the plurality of separate and independent data processing partitions notified in step (c) when the verification step (d) is complete; and f. providing status information from the one of the plurality of separate and independent data processing partitions notified in step (c) to the corresponding system control facility thereby indicating to the corresponding system control facility that the one of the plurality of resources has been deleted from the one of the plurality of separate and independent data processing partitions.

6. An apparatus for having a computer device dynamically partition a plurality of data processing resources among a number of separate and autonomous data processing partitions, comprising:

a. a plurality of system control facility elements, each of said plurality of system control facility elements coupled to a corresponding one of the number of separate and autonomous data processing partitions; and b. a centralized site configuration management element coupled to each of said plurality of system control facility elements, whereby said centralized site configuration management element dynamically partitions said plurality of data processing resources among said plurality of separate and autonomous data processing partitions via said plurality of system control facility elements.

7. A data processing system according to claim 6 wherein said centralized site configuration management element further comprises dynamic repartitioning means for dynamically repartitioning the plurality of data processing resources among the plurality of separate and autonomous data processing partitions via said plurality of system control facility elements.

8. An apparatus according to claim 7 further comprising means responsively coupled to said centralized site configuration management element for adding a one of the plurality of data processing resources to said plurality of data processing resources.

9. An apparatus according to claim 8 further comprising means responsively coupled to said centralized site configuration management element for deleting a one of the plurality of resources from said plurality of data processing resources.

10. A data processing system according to claim 9 wherein said centralized site configuration management element comprises:

a. inventory identifying means for identifying an inventory of said plurality of data processing resources; and b. dynamic partitioning means coupled to said inventory identifying means for dynamically partitioning said plurality of data processing resources identified by said inventory identifying means, among the plurality of separate and autonomous data processing partitions.

11. A data processing system according to claim 9 wherein each of said plurality of data processing partitions has a corresponding available device list.

12. A data processing system according to claim 11 wherein said centralized site configuration management element notifies a deactivating one of said plurality of separate and autonomous data processing partitions via said corresponding one of said plurality of system control facility elements when said dynamic repartitioning means of said centralized site configuration management element dynamically repartitions a deactivated one of said plurality of data processing resources from said deactivating one of said plurality of separate and autonomous data processing partitions; said notification indicating to said deactivating one of said plurality of separate and autonomous data processing partitions to deactivate said deactivating one of said plurality of data processing resources from said deactivating one of said plurality of separate and autonomous data processing partitions and to remove said deactivated one of said plurality of data processing resources from said corresponding available device list of said deactivating one of said plurality of separate and autonomous data processing partitions.

13. A data processing system according to claim 12 wherein said centralized site configuration management element further notifies an activating one of said plurality of separate and autonomous data processing partitions via said corresponding one of said plurality of system control facility elements when said dynamic repartitioning means of said centralized site configuration management element dynamically repartitions an activated one of said plurality of data processing resources from said activating one of said plurality of separate and autonomous data processing partitions; said notification indicating to said activating one of said plurality of separate and autonomous data processing partitions to activate said activated one of said plurality of data processing resources into said activating one of said plurality of separate and autonomous data processing partitions and to add said activated one of said plurality of data processing resources from said available device list of said activating one of said plurality of separate and autonomous data processing partitions.

14. A data processing system according to claim 13 wherein at least one of said plurality of data processing resources comprises an instruction processor.

15. A data processing system according to claim 13 wherein at least one of said plurality of data processing resources comprises a memory module.

16. A data processing system according to claim 15 wherein at least one of said plurality of data processing resources comprises an input/output controller.

17. A data processing system according to claim 16 wherein at least one of said plurality of data processing resources comprises a peripheral device.

18. A data processing system according to claim 17 wherein at least one of said plurality of data processing resources comprises a computer program.

19. An apparatus comprising:
  a. a plurality of data processing resources;
  b. a centralized control element coupled to each of said plurality of data processing resources; said centralized control element having an inventory table, said inventory table indicating which of said plurality of data processing resources are available;
  c. dynamic partitioning means coupled to said centralized control element for dynamically partitioning the available ones of said plurality of data processing resources into a plurality of separate and autonomous data processing partitions;
  d. adding means coupled to said centralized control element and further coupled to said plurality of data processing resources for adding a predetermined one of said plurality of data processing resources to a predetermined one of said plurality of separate and autonomous data processing partitions; and
  e. storing means coupled to said predetermined one of said plurality of separate and autonomous data processing partitions for storing a predefined set of characteristics of said predetermined one of the plurality of data processing resources.

20. An apparatus comprising:
  a. a plurality of data processing resources;
  b. a centralized control element coupled to each of said plurality of data processing resources; said centralized control element having an inventory table, said inventory table indicating which of said plurality of data processing resources are available;
  c. dynamic partitioning means coupled to said centralized control element for dynamically partitioning the available ones of said plurality of data processing resources into a plurality of separate and autonomous data processing partitions; and
  d. deleting means coupled to said centralized control element and further coupled to said plurality of data processing resources for deleting a predetermined one of said plurality of data processing resources from a predetermined one of said plurality of separate and autonomous data processing partitions.

21. A method for adding a resource having predefined characteristics to one of a plurality of separate and independent data processing partitions using a digital computer, each of the plurality of separate and independent data processing partitions having a corresponding system control facility, the resource having a corresponding status and a corresponding identity, comprising:
  a. adding the resource to an inventory table within a centralized site configuration management system;
  b. selecting one of the plurality of separate and independent data processing partitions;
  c. adding the resource to a partition file, wherein the partition file corresponds to the selected one of the plurality of separate and independent data processing partitions;
  d. storing the predefined characteristics of the resource in an operations file, wherein the operations file corresponds to the selected one of the plurality of separate and independent data processing partitions;
  e. transferring the information contained in the operations file, the partition file and the notification to a system control facility associated with the selected one of the plurality of separate and independent data processing partitions; and
  f. adding the transferred information contained in the operations file, partition file and notification to a data base contained within the selected one of the plurality of separate and independent data processing partitions.

22. A method for deleting a resource having predefined characteristics from one of a plurality of separate and independent data processing partitions using a digital computer, each of the plurality of separate and independent data processing partitions having a corresponding system control facility and a corresponding partition file, the corresponding partition file being part of a centralized site configuration management data base, comprising:
  a. deleting the resource from the corresponding partition file, wherein the corresponding partition file corresponds to the one of the plurality of separate and independent data processing partitions in which the resource is currently assigned;
  b. notifying the one of the plurality of separate and independent data processing partitions via the corresponding system control facility that the resource is no longer available;
  c. deleting the resource from the one of the plurality of separate and independent data processing partitions notified in step (b); and
  d. providing status information from the one of the plurality of separate and independent data processing partitions notified in step (b) to the corresponding system control facility thereby indicating to the corresponding system control facility that the resource has been deleted from the one of the plurality of separate and independent data processing partitions.

23. A method of having a site data facility personal computer partition a plurality of data processing resources among a number of separate and autonomous data processing systems, each of the number of separate and autonomous data processing systems having a corresponding one of a plurality system console personal computers coupled to the site data facility personal computer for controlling the plurality of data processing resources partitioned thereto, comprising:

a. making an inventory of the plurality of data processing resources; and
  b. partitioning selected ones of the plurality of data processing resources among the number of separate and autonomous data processing systems, said partitioning step being performed by the site data facility personal computer wherein the site data facility personal computer uses said inventory to select the selected ones of the plurality of data processing resources.

24. A method according to claim 23 further comprising:
  a. adding a first one of a plurality of resources to said inventory of said plurality of data processing resources; and
  b. adding said first one of a plurality of resources to a selected one of said number of separate and autonomous data processing systems, whereby said first one of a plurality of resources is controlled by a corresponding one of a plurality of system console personal computers.

25. A method according to claim 23 further comprising:
  a. deleting a second one of a plurality of resources from a one of said number of separate and autonomous data processing systems; and
  b. deleting said second one of a plurality of resources from said inventory of said plurality of data processing resources.

26. A method for adding one of a plurality of resources having predefined characteristics to one of a plurality of separate and independent data processing partitions using a site data facility personal computer, each of the plurality of separate and independent data processing partitions having a corresponding one of a plurality of system console personal computers, the site data facility personal computer being coupled to the plurality of system console personal computers, the one of the plurality of resources having a corresponding status and a corresponding identity, comprising:

a. adding the one of the plurality of resources to an inventory table within the site data facility personal computer;
  b. setting the status associated with the one of the plurality of resources to an inactive state;
  c. storing the identity of the one of the plurality of resources within the site data facility personal computer;
  d. selecting one of the plurality of separate and independent data processing partitions;
  e. adding the one of the plurality of resources to a partition file, wherein the partition file corresponds to the selected one of the plurality of separate and independent data processing partitions;
  f. storing the predefined characteristics of the one of the plurality of resources in an operations file, wherein the operations file corresponds to the selected one of the plurality of separate and independent data processing partitions;
  g. generating a notification after the storing step (f) is complete;
  h. transferring the information contained in the operations file, the partition file and the notification to the one of the plurality of system console personal computers associated with the selected one of the plurality of separate and independent data processing partitions;
  i. adding the transferred information contained in the operations file, partition file and notification to a data base contained within the selected one of the plurality of separate and independent data processing partitions; and
  j. reporting to the one of the plurality of system console personal computers within the selected one of the plurality of separate and independent data processing partitions when the adding step (i) is complete.

27. A method for deleting one of a plurality of resources having predefined characteristics from one of a plurality of separate and independent data processing partitions using a site data facility personal computer, each of the plurality of separate and independent data processing partitions having a corresponding one of a plurality of system console personal computers and a corresponding partition file, the corresponding partition file being part of a site data facility personal computer, the site data facility personal computer being coupled to the plurality of system console personal computers, comprising:

a. deleting the one of the plurality of resources from the corresponding partition file, wherein the corresponding partition file corresponds to the one of the plurality of separate and independent data processing partitions in which the one of the plurality of resources is currently assigned;
  b. notifying the corresponding one of the plurality of system console personal computers that the one of the plurality of resources is no longer available;
  c. notifying the one of the plurality of separate and independent data processing partitions via the corresponding one of the plurality of system console personal computers that the one of the plurality of resources is no longer available;
  d. verifying that the one of the plurality of resources is not being used by the one of the plurality of separate and independent data processing partitions notified in step c is complete;
  e. deleting the one of the plurality of resources from the one of the plurality of separate and independent data processing partitions notified in step (c) when the verification step (d) is complete; and
  f. providing status information from the one of the plurality of separate and independent data processing partitions notified in step (c) to the corresponding one of the plurality of system console personal computers thereby indicating to the corresponding one of the plurality of system console personal computers that the one of the plurality of resources has been deleted from the one of the plurality of separate and independent data processing partitions.

28. An apparatus comprising:
  a. a plurality of data processing resources;
  b. a personal computer coupled to each of said plurality of data processing resources; said personal computer having an inventory table, said inventory table indicating which of said plurality of data processing resources are available;
  c. partitioning means coupled to said personal computer for partitioning the available ones of said plurality of data processing resources into a plurality of separate and autonomous data processing partitions;

d. adding means coupled to said personal computer and further coupled to said plurality of data processing resources for adding a predetermined one of said plurality of data processing resources to a predetermined one of said plurality of separate and autonomous data processing partitions; and e. storing means coupled to said predetermined one of said plurality of separate and autonomous data processing partitions for storing a predefined set of characteristics of said predetermined one of the plurality of data processing resources.

29. An apparatus comprising:

a. a plurality of data processing resources;

b. a personal computer coupled to each of said plurality of data processing resources; said personal computer having an inventory table, said inventory table indicating which of said plurality of data processing resources are available;

c. partitioning means coupled to said personal computer for partitioning the available ones of said plurality of data processing resources into a plurality of separate and autonomous data processing partitions; and d. deleting means coupled to said personal computer and further coupled to said plurality of data processing resources for deleting a predetermined one of said plurality of data processing resources from a predetermined one of said plurality of separate and autonomous data processing partitions.

30. A method for adding a resource having predefined characteristics to one of a plurality of separate and independent data processing partitions, each of the plurality of separate and independent data processing partitions having a corresponding one of a plurality of system console personal computers, the resource having a corresponding status and a corresponding identity, comprising:

a. adding the resource to an inventory table within a site data facility personal computer, the site data facility personal computer being coupled to the plurality of system console personal computers;

b. selecting one of the plurality of separate and independent data processing partitions;

c. adding the resource to a partition file, wherein the partition file corresponds to the selected one of the plurality of separate and independent data processing partitions;

d. storing the predefined characteristics of the resource in an operations file, wherein the operations file corresponds to the selected one of the plurality of separate and independent data processing partitions;

e. transferring the information contained in the operations file, the partition file and the notification to the corresponding one of the plurality of system console personal computers associated with the selected one of the plurality of separate and independent data processing partitions; and f. adding the transferred information contained in the operations file, partition file and notification to a data base contained within the selected one of the plurality of separate and independent data processing partitions.

31. A method for deleting a resource having predefined characteristics from one of a plurality of separate and independent data processing partitions, each of the plurality of separate and independent data processing partitions having a corresponding one of a plurality of system console personal computers and a corresponding partition file, the corresponding partition file being part of a site data facility personal computer, the site data facility personal computer coupled to the plurality of system console personal computers, comprising:

a. deleting the resource from the corresponding partition file, wherein the corresponding partition file corresponds to the one of the plurality of separate and independent data processing partitions in which the resource is currently assigned;

b. notifying the one of the plurality of separate and independent data processing partitions via the corresponding one of the plurality of system console personal computers that the resource is no longer available;

c. deleting the resource from the one of the plurality of separate and independent data processing partitions notified in step (b); and d. providing status information from the one of the plurality of separate and independent data processing partitions notified in step (b) to the corresponding system console personal computer thereby indicating to the corresponding system console personal computer that the resource has been deleted from the one of the plurality of separate and independent data processing partitions.

* * * * *